W. KOUNS.
HAY RAKE.
APPLICATION FILED JAN. 3, 1920.

1,362,425.  Patented Dec. 14, 1920.
2 SHEETS—SHEET 1.

WITNESSES
E. A. Wilson

INVENTOR
WESLEY KOUNS.
BY
ATTORNEYS

W. KOUNS.
HAY RAKE.
APPLICATION FILED JAN. 3, 1920.
1,362,425.
Patented Dec. 14, 1920.
2 SHEETS—SHEET 2.
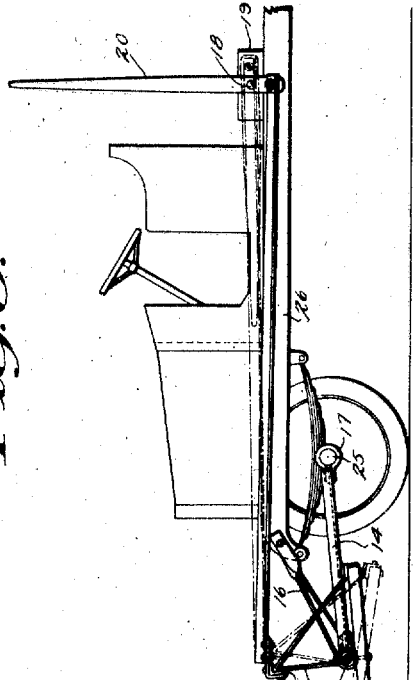
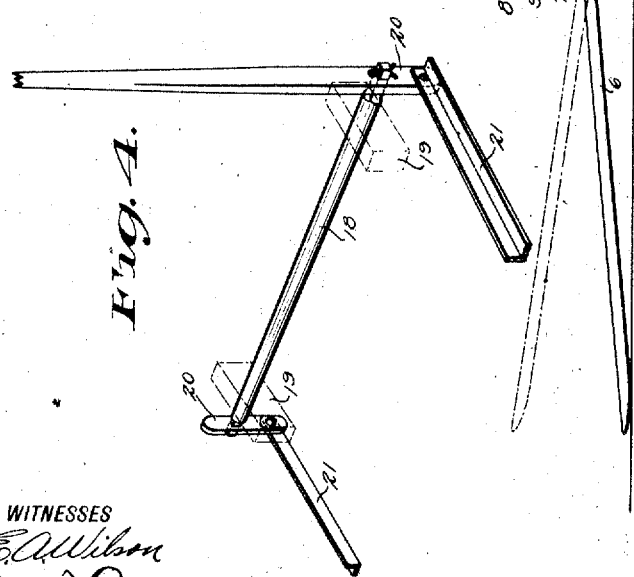
WITNESSES
INVENTOR
WESLEY KOUNS.
BY
ATTORNEYS

UNITED STATES PATENT OFFICE.

WESLEY KOUNS, OF SALINA, KANSAS.

HAY-RAKE.

1,362,425.  Specification of Letters Patent.  Patented Dec. 14, 1920.

Application filed January 3, 1920. Serial No. 349,151.

*To all whom it may concern:*

Be it known that I, WESLEY KOUNS, a citizen of the United States, and a resident of Salina, in the county of Saline and State of Kansas, have invented a new and Improved Hay-Rake, of which the following is a full, clear, and exact description.

This invention relates to farm tools and implements, and particularly to rakes. More specifically, the invention relates to a motor-propelled hay rake or a combination hay rake and motor truck.

An object of my invention is to provide a hay rake in the form of an attachment which may be used in connection with any form of motor vehicle, such as a motor truck, for the varied line of purposes to which rakes are put on the farm and in agricultural activities.

It is a further purpose of my invention to provide an improved form of hay-rake attachment which is easy and convenient to connect up to a motor truck and remove therefrom.

My invention also contemplates the construction of a hay rake of simplified design, simple to operate, inexpensive in construction, and unlikely to get out of working order.

With the above and other objects in view, the invention has relation to the improved hay rake, and combination rake and motor truck, as set forth in the several appended claims defining this invention, and one practical embodiment of which is described in the following specification, and illustrated in the accompanying drawings.

Fig. 3 portrays a side elevation of the rake mounted on the front end of a motor truck.

Fig. 4 shows a fragmentary detail view of the rake-dumping mechanism.

A farm tool and rake constructed in accordance with the purposes of my invention employ a toothed rake having a reach bar and bracket mounted thereon. The rake is connected up to any suitable motor truck or motor vehicle by attaching the reach bar and bracket to the axle and frame of the car. The rake also has a dumping mechanism which may be conveniently operated by the motor-truck driver for governing the working position of the teeth. The rake is simple and easy to mount on a motor truck or car and has a varied line of uses in agricultural work.

In presenting a more detailed description of my invention, there is pointed out the plurality of rake teeth 6 pointing forward in parallel relation with the rear ends of the teeth fixed to a frame. The frame essentially comprises a rake bar 7 and a complementary beam 8 spaced above and parallel to the rake bar. Frame brackets 9 are made in the shape of a triangle and are used to complete the rake frame by bolting one corner, or the upper corner, to the beam 8, with the two lower corners bolted to the rear ends of the rake teeth 6 and the rake bar 7. A number of these frame brackets 9 are employed to complete the rake frame and for spacing the rake bar 7 and beam 8 apart in rigid and strong relation.

Figure 1:
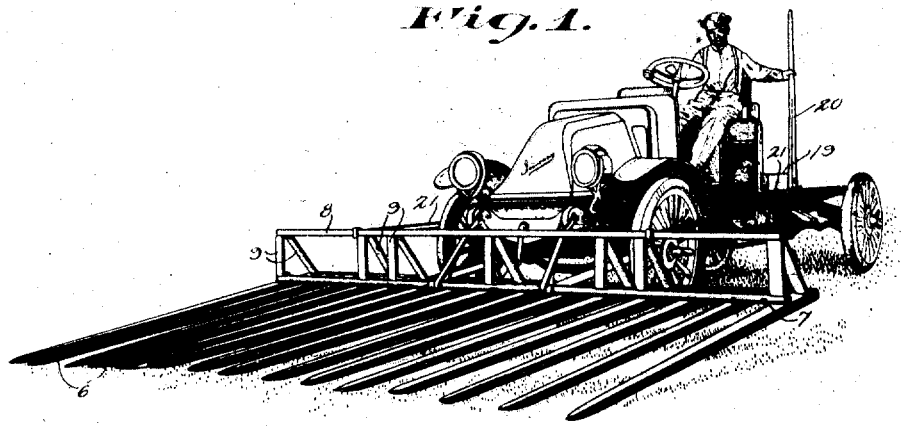
Figure 1 shows a perspective view of a hay rake connected up with an automobile, or more particularly used in connection with a motor truck for raking up grass and hay.
Figure 2:
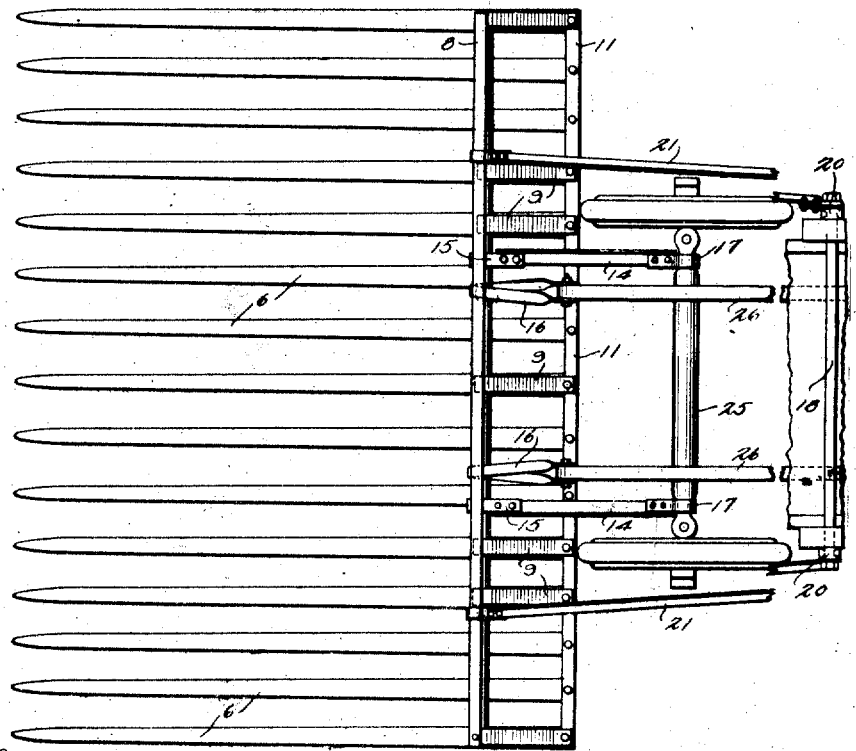
Fig. 2 illustrates a plan view of a rake assembled in connection with a motor truck to disclose detail parts.

The rear ends of the rake teeth project somewhat beyond the rake bar 7, and a bolt is passed through the rake tooth, through the rake bar 7, and through the lower end of the frame bracket 9, which securely ties the three parts together. There is a toothed bar 11 fixed to the back ends of the teeth 6 by bolting each tooth to said bar 11, as shown in Fig. 2. The rake bar 7 and the toothed bar 11 are spaced apart and each one is bolted or otherwise fastened to the individual teeth. This construction causes the teeth 6 to project forward in fixed position and parallel one to the other, the bars 7 and 11 acting to prevent loose movement of the teeth 6. The lower rear end of each frame bracket may be bolted to the toothed bar 11 and teeth 6 in order to firmly anchor the three parts together. This construction provides a rigid rake frame having a triangular cross section. The triangular rake frame functions to support the long rake teeth 6 in their forwardly projecting and working position.

There is provided suitable attachment means for use in mounting the rake on a motor car or truck in order that the agriculturist may use this rake in connection with any appropriate motor vehicle he may have on the farm. To this end, a pair of reach bars 14 are connected to the rake bar 7 by employing a cuff 15 fixed to one end of the reach bar and pivotally confined on the rake bar 7. There are two reach bars 14 pivotally mounted on the rake bar 7 and spaced apart a suitable distance in order that the other ends of the reach bars may be attached to the front axle of a motor truck. The rear ends of the reach bars 14 are also provided with cuffs 17 securely attached to the reach bar with bolts, which may be removed in order to connect and disconnect the rake with the motor truck. A bracket 16 comprises a piece of stock iron and is made in the form of a loop to hold the rake bar 7. There are a pair of these brackets 16 employed for the purpose of connecting the rake with a motor car, and the brackets are spaced apart on the rake bar 7 with each bracket located near a reach bar 14.

There is a dumping mechanism employed for the purpose of raising and lowering the forward end of the rake teeth. There is provided a shaft 18 journaled in bearing blocks 19 fixed to the motor truck. A lever 20 is fixed to each end of the shaft 18. One of the levers 20 is extended to provide an operating handle or lever in order to derive considerable leverage over the required dumping actions of the rake. Each lever 20 has one end of a link 21 pivotally connected thereto, while the other ends of the links 21 connect with the rake beam 8.

In mounting the rake, as above described, in operative position on a motor car, it is necessary to attach the outer ends of the reach bars 14 to the front axle 25 of the motor truck. This is accomplished by unbolting the cuffs 17 and mounting them on the shaft 25, after which the reach bars 14 are again bolted up to the cuffs. The brackets 16 are next connected to the frame 26 of the motor truck by bolting the upper ends of said brackets to the forward end of the motor-truck frame. It is seen how the two reach bars 14 hold the rake bar 7 forward of the motor truck and in spaced, parallel relation to the axle of the truck. The brackets 16 act to support and hold the rake bar 7 and the rake frame above the ground in order that the rear ends of the rake teeth will not drag on the ground, and also to provide adequate clearance to permit the rear ends of the rake teeth to be tilted up and down during the dumping operation. The front end of the rake may be raised and lowered by moving the long lever 20 back and forth. This action exerts a pull through both links 21 on the top of the rake frame 9 to pivot the rake bar 7 in the cuffs 15 of the reach bar and in the loop bracket 16. In this way the rake may be tilted up and down on the supports by actuating the lever 20.

In the operation of this combination hay rake and motor truck, it is only necessary to assemble the rake on the front end of the motor truck as hereinbefore described. The operator will then draw the lever 20 forward, which lifts the rake to the position shown in dotted lines in Fig. 3. The operator may then drive the rake to any part of the field to be worked, and brings the rake into service position by lifting the lever to a normal vertical position, which lowers the rake teeth to the ground for picking up hay and straw as the motor is driven across the meadow for harvesting. After a load of hay, or a rakeful, has been gathered, the operator may then drive the load to any appropriate place for storing the hay; or the rake may be used in piling the hay in windrows, as is the ordinary practice in harvesting hay. The operator dumps the hay from the rake by lowering the teeth 6 on the ground and backing the motor truck away from the load of hay which is dragged from the rake by engaging the ground as the truck is backed away.

This combination hay rake and motor truck provides an indispensable combination for general farm work, as the farmer is never put to the necessity of buying a separate power-driven rake. With this tool the agriculturist has full and unobstructed use of the motor car when the rake is not in use.

Having thus described my invention, what I desire to secure by Letters Patent is:

1. A rake in combination with a motor truck, comprising a toothed rake, attachment means associated with the rake for mounting said rake on a motor truck, and a dumping mechanism employed for raising and lowering the rake relatively to the ground and adapted when forwardly displaced to raise the rake and when rearwardly displaced to lower the rake.

2. A hay rake in combination with a motor truck, comprising a plurality of rake teeth, a rectangular rake frame carrying the rake teeth, a set of reach bars employed on the rake frame to connect the rake with a motor truck, and a set of brackets employed on the rake frame to connect the rake with a motor truck.

3. A hay rake in combination with a motor truck, comprising a plurality of rake teeth, a rectangular rake frame carrying the rake teeth, a set of reach bars employed on the rake frame to connect the rake with a motor truck, a set of brackets employed on the rake frame to connect the rake with a motor truck, and a lever arranged to raise and lower the rake teeth.

4. An attachment rake for use in connection with motor-driven vehicles, comprising a rake frame, a plurality of rake teeth mounted on the frame, reach bars carried on the frame, attachment brackets carried on the frame, said reach bars and attachment brackets employed for the purpose of connecting the rake with a motor truck, and a lever arranged for the purpose of raising and lowering the rake, raising of the lever serving to lower the rake, and lowering of the lever serving to raise the rake.

5. An attachment rake for use in connection with motor trucks, comprising a rake frame having a triangular cross section, a plurality of teeth carried on the rake frame, a number of reach bars pivotally connected with the rake frame, and brackets pivotally connected with the rake frame, the last two members recited being employed to mount the rake on a motor car, a pair of levers pivoted on the motor car, and links connecting the pair of levers below the pivots thereof with the rake frame to raise the rake by lowering the lever and lower the rake by raising the lever.

6. In a rake construction comprising, a rake frame, a tubular rake bar employed in connection with the rake frame, a plurality of rake teeth fixed to the tubular rake bar, a number of attachment brackets pivotally connected with the rake bar to connect the rake to a vehicle, and a lever to raise and lower the rake, said lever being connected with the rake below its pivot point and adapted when extended forwardly in a horizontal position to raise the rake and when elevated to a vertical position, to lower the rake.

WESLEY KOUNS.